(12) United States Patent
Jiang et al.

(10) Patent No.: US 6,288,811 B1
(45) Date of Patent: Sep. 11, 2001

(54) WDM OPTICAL COMMUNICATION SYSTEM WITH CHANNELS SUPPORTING MULTIPLE DATA FORMATS

(75) Inventors: Leon Li-Feng Jiang, Princeton, NJ (US); Raul B. Montalvo, North Potomac, MD (US); John Lynn Shanton, III, Middletown, MD (US); Wenli Yu, Gaithersburg, MD (US)

(73) Assignee: Seneca Networks, Rockville, MD (US)

( * ) Notice: Subject to any disclaimer, the term of this patent is extended or adjusted under 35 U.S.C. 154(b) by 0 days.

(21) Appl. No.: 09/688,804

(22) Filed: Oct. 17, 2000

(51) Int. Cl.[7] .............................. H04B 10/00; H04B 10/02
(52) U.S. Cl. ......................... 359/127; 359/124; 359/125; 359/128
(58) Field of Search ................................ 359/124, 125, 359/127, 128

(56) References Cited

U.S. PATENT DOCUMENTS

| | | | |
|---|---|---|---|
| 5,548,431 | 8/1996 | Shin et al. | 359/119 |
| 5,589,967 | 12/1996 | Auffret | 359/123 |
| 5,647,035 | 7/1997 | Cadeddu et al. | 385/24 |
| 5,706,111 | 1/1998 | Morales et al. | 359/125 |
| 5,751,454 | 5/1998 | MacDonald et al. | 359/119 |
| 5,760,934 | 6/1998 | Sutter et al. | 359/119 |
| 5,796,501 | 8/1998 | Sotom et al. | 359/119 |
| 5,896,212 | 4/1999 | Sotom et al. | 359/125 |
| 6,046,833 | 4/2000 | Sharma et al. | 359/119 |
| 6,069,892 | 5/2000 | Tochio | 370/395 |
| 6,084,694 | * 7/2000 | Milton | 359/124 |
| 6,101,012 | 8/2000 | Danagher et al. | 359/127 |
| 6,101,013 | 8/2000 | Monacos et al. | 359/139 |
| 6,137,800 | * 10/2000 | Wiley | 370/396 |
| 6,141,339 | * 10/2000 | Kaplan | 370/352 |

\* cited by examiner

*Primary Examiner*—Leslie Pascal
*Assistant Examiner*—Agustin Bello
(74) *Attorney, Agent, or Firm*—Margaret Burke

(57) ABSTRACT

The present invention provides a flexible WDM optical communication system in which each optical channel of the WDM optical communication signal can simultaneously accept multiple data formats. In one embodiment, the WDM optical system includes an optical waveguide having an optical add-drop multiplexer to selectively add and/or drop one or more optical channels to/from the WDM signal carried on the waveguide. A first source of data imparts information onto a first optical channel in a packet format while a second source of data imparts information onto the first optical channel in a time division multiplexed format. Other data sources having other data formats may also be included. An optical network interface electrically communicates with the data sources, placing the data from these sources onto the first optical channel which is generated from an optical source such as a laser. An optical path carries the optical channel from the optical source to the optical add-drop multiplexer. From there, it is multiplexed onto the optical waveguide, merging with the other optical channels of the WDM optical signal.

2 Claims, 3 Drawing Sheets

WDM OPTICAL COMMUNICATION SYSTEM WITH CHANNELS SUPPORTING MULTIPLE DATA FORMATS

BACKGROUND OF THE INVENTION

1. Field of the Invention

The present invention relates to wavelength division multiplexed optical communication systems in general and, more particularly, to wavelength division multiplexed optical communication systems having individual optical channels which are capable of simultaneously supporting multiple electronic data formats such as TDM, ATM, and IP.

2. Description of the Related Art

As the need for communication signal bandwidth increases, wavelength division multiplexing (WDM) has progressively gained popularity for multiplying the transmission capacity of a single optical fiber. A review of optical networks, including WDM networks, can be found in Ramaswami et al., *Optical Networks: A Practical Perspective* (Morgan Kaufmnan, © 1998), the disclosure of which is incorporated herein by reference. Typically, wavelength division multiplexed optical communication systems have been designed and deployed in the long-haul, interexchange carrier realm. In these long-haul optical systems, a wavelength division multiplexed optical communication signal comprising plural optical channels at different wavelengths travels in a single direction on a single fiber (unidirectional transmission). Because the communication traffic in such systems commonly travels many hundreds of kilometers, the need for add-drop multiplexing of individual channels is infrequent, occurring at widely-spaced add-drop nodes.

Although the optical infrastructure of long-haul WDM optical systems can accommodate future traffic needs created by increased demand from traditional and multimedia Internet services, this traffic must first be collected and distributed by local networks. Currently, such local networks are structured to carry a single wavelength, time-division multiplexed (TDM) optical signal along a fiber network organized into various ring structures. To route the various components of the TDM signal, numerous electronic add-drop multiplexers are positioned along the fiber network. At each add-drop location, the entire optical signal is converted into an electrical signal; the portions of the electrical signal which are destined for that add-drop point are routed accordingly. The remaining portions of the electrical signal are converted back to a new TDM optical signal and are output through the electronic add-drop multiplexer. Thus, before a user can access the bandwidth-rich WDM long-haul transport networks, he must first pass through the bottleneck of the local networks.

To increase capacity on these local networks, e.g., by using higher-rate optical transmitters, all of the equipment positioned on an optical ring must be upgraded. Further, providing additional add-drop nodes along a ring requires a re-examination of the optical power budget for the entire ring structure. Although WDM may be "overlaid" on such a local network to increase capacity, an all-optical solution is insufficient to meet the needs of future service demands. In particular, conventional WDM networks cannot handle the rigorous add-drop requirements of local networks to provide adequate routing of traffic. Further, current WDM solutions do not address the problems posed by the need to carry traffic having various data formats such as TDM, ATM, IP, MPLS, etc. simultaneously on the same optical network.

Several attempts have been made to remedy the problems of conventional optical networks. In U.S. Pat. No. 5,751, 454, a wavelength bypassed ring network is proposed in which the wavelength channels are arranged so that some bypass each node and terminate further along the ring. Signals on bypass routes are not processed by intermediate nodes. While this system allows for fixed WDM add-drop on ring networks, it does not address the need for various data formats to be able to access the optical network.

U.S. Pat. No. 6,069,892 describes a wavelength division multiplexed optical communication system configured to carry fixed-length cells such that the system is optimized as an ATM cell transmission system. Because this system is optimized for ATM traffic, each optical channel of the WDM signal carries cell-based data, i.e., data having a single format. While such a technique enhances the use of wavelength division multiplexing with cell-formatted protocols, the formats for other protocols are not carried by the system.

In U.S. Pat. No. 6,084,694, a WDM communications network having a plurality of nodes is described. The wavelengths carried by the network are organized into wavebands of four channels; each node includes a filter for statically dropping a waveband and passively forwarding the remaining bands. To create what is termed a "protocol independent" network, each optical wavelength may be connected to a different data source. Thus, as shown in FIG. 9 of the patent, a SONET OC-3 signal may be sent from node Z to node B without conversion to an electrical signal by intermediate nodes. While the '694 patent depicts potential solutions to some optical network problems, it does not describe a system with sufficient flexibility to route any type of data format onto any channel wavelength and deliver it to any node within the optical network.

Thus, there is a need in the art for a wavelength division multiplexed optical network which is capable of transporting multiple data formats simultaneously on an individual optical channel. Such an optical network would impart the flexibility required to provide access to any type of data format to any customer at any point along an optical network.

SUMMARY OF THE INVENTION

The present invention provides a flexible wavelength division multiplexed optical communication system capable of supporting any data format from any customer along an optical network. Each optical channel of the wavelength division multiplexed optical communication signal can simultaneously accept multiple data formats; in this manner, all types of data formats can be placed on all of the optical channels in the WDM system.

In one embodiment, the WDM optical system includes an optical waveguide configured to carry a wavelength division multiplexed optical communication signal composed of plural optical channels, each of which has a discrete wavelength. An optical add-drop multiplexer optically communicates with the optical waveguide to selectively add and/or drop one or more optical channels to/from the WDM signal carried on the waveguide.

A first source of data imparts information onto a first optical channel in a packet format while a second source of data imparts information onto the first optical channel in a time division multiplexed format. Other data sources having other data formats may also be included. An optical network interface electrically communicates with the data sources, placing the data from these sources onto the first optical channel which is generated from an optical source such as a laser. An optical path carries the optical channel from the optical source to the optical add-drop multiplexer. From there, it is multiplexed onto the optical waveguide, merging with the other optical channels of the WDM optical signal.

DETAILED DESCRIPTION

Figure 1:
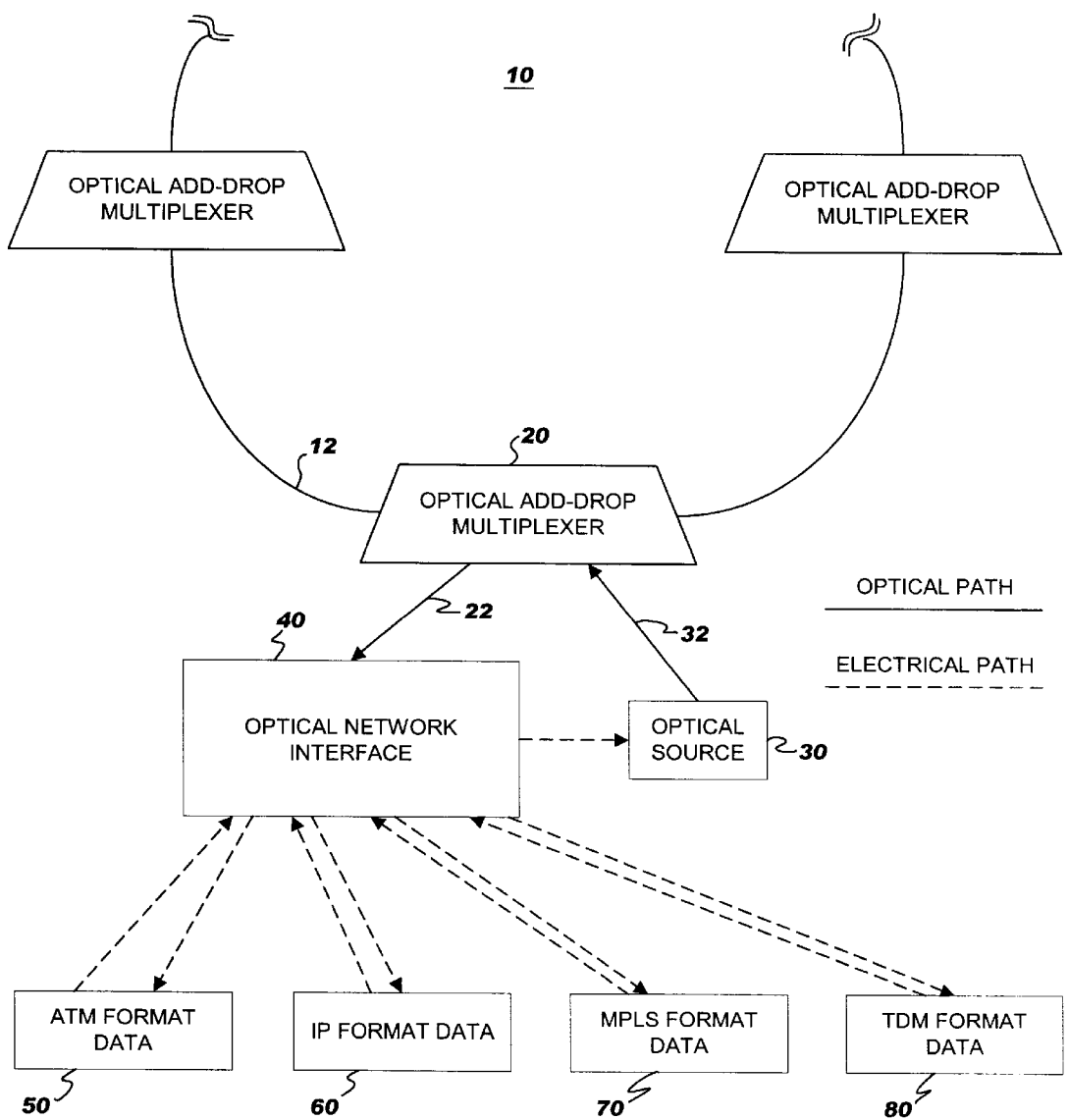
FIG. 1 is a wavelength division multiplexed optical communication system configured to simultaneously accept multiple data formats on an individual optical channel according to a first embodiment of the present invention.

Turning now to the drawings in detail in which like numerals indicate the same or similar elements, FIG. 1 depicts a wavelength division multiplexed optical communication system 10 according to a first embodiment of the present invention. Optical system 10 includes optical waveguide 12 which is configured to carry a wavelength division multiplexed optical signal composed of plural optical channels, each channel having a discrete wavelength. As used herein, the expression "wavelength division multiplexed" or "WDM" refers to any optical system or signal composed of plural optical channels having different wavelengths, regardless of the number of channels in the system or signal. As such, the term "wavelength division multiplexing" or "WDM" encompasses all categories of WDM such as DWDM (dense wavelength division multiplexing) and CWDM (coarse wavelength division multiplexing). For clarity of presentation, only one system- the "work" system- is shown here; it is understood that a substantially similar system is provided for the "protect" waveguide.

Waveguide 12 may form part of a ring network, mesh network, point-to-point network, subtended ring network, or any other network topology. Typically, in local networks, ring structures are employed, using "work" and "protect" rings. Along the ring, several electrical add-drop nodes are provided (as discussed in the "Background" section above). In such a topology, optical add-drop multiplexers 20 would replace the convention electrical nodes.

Optical add-drop multiplexer 20 is interposed along waveguide 12 to optically communicate with the waveguide for receiving a wavelength division multiplexed optical signal. As used herein, the expression "optically communicates" designates an optical path between two elements. The optical path may be a direct path or it may route through intermediate optical devices (e.g., optical isolators, additional optical circulators, filters, amplifiers, etc.). Optical add-drop multiplexer 20 may be selected from a number of devices depending upon the overall configuration of optical system 10. Considerations include the number of optical channels in the system, whether the channels propagate unidirectionally or bidirectionally along waveguide 12, whether it is desired to drop a fixed number of channels of fixed wavelengths at the same drop point (or, conversely, a variable number of channels of different wavelengths), etc. In the simplest case, optical add-drop multiplexer 20 is configured to drop or add a single optical channel of a fixed wavelength, as depicted in the exemplary embodiment of FIG. 1. Such an add-drop multiplexer can take basic configuration of a three-port optical circulator and an optical coupler with an in-fiber Bragg grating disposed in a fiber connecting the devices. A unidirectional WDM signal enters the first circulator; a channel to be dropped is reflected by the grating to a drop port while the remaining channels of the WDM signal pass through to the coupler. A channel to be added enters the coupler and is output to the transmission waveguide where it joins the remaining channels of the WDM optical signal. Such a configuration is depicted in *Optical Networks: A Practical Perspective*, incorporated by reference above. While this is an example of a single channel add-drop multiplexer which may be used with the present invention, it is understood that any device capable of selecting one or more optical channels from a WDM optical signal and/or adding an optical channel to a WDM optical signal is contemplated for use in the optical systems of the present invention.

A channel to be added to the optical communication system is produced by optical source 30. Optical source 30 can be selected from any device which produces an optical signal at the desired channel wavelength. Such optical sources include, but are not limited to, DFB lasers, Bragg grating lasers, etc. In the embodiment depicted in FIG. 1, optical source 30 produces a channel having a wavelength designated $\lambda_1$, preferably selected to be a wavelength within the gain band of an optical fiber such as an erbium-doped fiber amplifier (EDFA).

Data to be placed on the optical channel are associated with a variety of protocols. The term "data," as used herein, broadly represents any type of information to be transmitted over an optical communication system including, but not limited to, voice, images, video, music, text, etc. As defined in *Telecommunication Transmission Systems*, (Robert Winch, second edition, McGraw-Hill, N.Y.© 1998), the disclosure of which is incorporated by reference herein, a protocol is "a set of rules that control a sequence of events which take place between equipment or layers on the same level." ATM (Asynchronous Transfer Mode), IP (Internet Protocol), MPLS (MultiProtocol Label Switching), TDM (Time Division Multiplexing) are all examples of protocols used to carry data over optical networks. Within these protocols are various data formats which define how the individual bits of information are grouped in a signal (e.g., header bits, payload bits, identifier bits, routing information bits, Thus, for each protocol (e.g., ATM, IP, MPLS, TDM, etc.) there is an associated data format for that protocol. In the context of the present invention, the use of the terms ATM, IP, MPLS, TDM, etc. refer to the data format associated with that protocol unless otherwise indicated.

The information to be placed on optical channel $\lambda_1$ includes data configured in a variety of the data formats set forth above; the optical system is constructed so that plural data formats can be simultaneously and independently placed on a single optical channel without conversion to another data format prior to placement on that channel. To facilitate the placement of each of these data formats on the optical channel, optical network interface 40 is provided. Optical network interface 40 electrically communicates with plural data sources each of which is configured using a different data format—ATM formatted data source 50, IP formatted data source 60, MPLS formatted data source 70, and TDM formatted data source 70. The optical network interface intelligently groups the information from data sources 50, 60, 70, 80 etc. for placement on the optical channel, $\lambda_1$. Note that $\lambda_1$ is used as an exemplary channel; through the use of the optical network interface, the information may be placed on any optical channel to be added to the system. When the optical channel is selected in accordance with SONET standards, the data groups created by the optical network interface place each data group into a SONET-compatible slot on the optical channel. Alternatively, other types of optical channels may be selected such as those which use the digital wrapper standard. Optical network interface 40 may comprise a single device or, optionally, plural devices which perform the functions described above.

The formatted data groups are electrically transmitted to the optical source 30 where an appropriate modulator places the information onto the optical channel through either direct modulation techniques (e.g., varying a current source to a laser) or external modulation techniques (e.g., through Mach-Zehnder modulators, electroabsorption modulators, etc.). Alternatively, the optical source may form part of the optical network interface 40. The modulated optical channel is routed via optical path 32 to optical add-drop multiplexer 20 where it joins the WDM optical signal propagating on the transmission waveguide.

Figure 2:
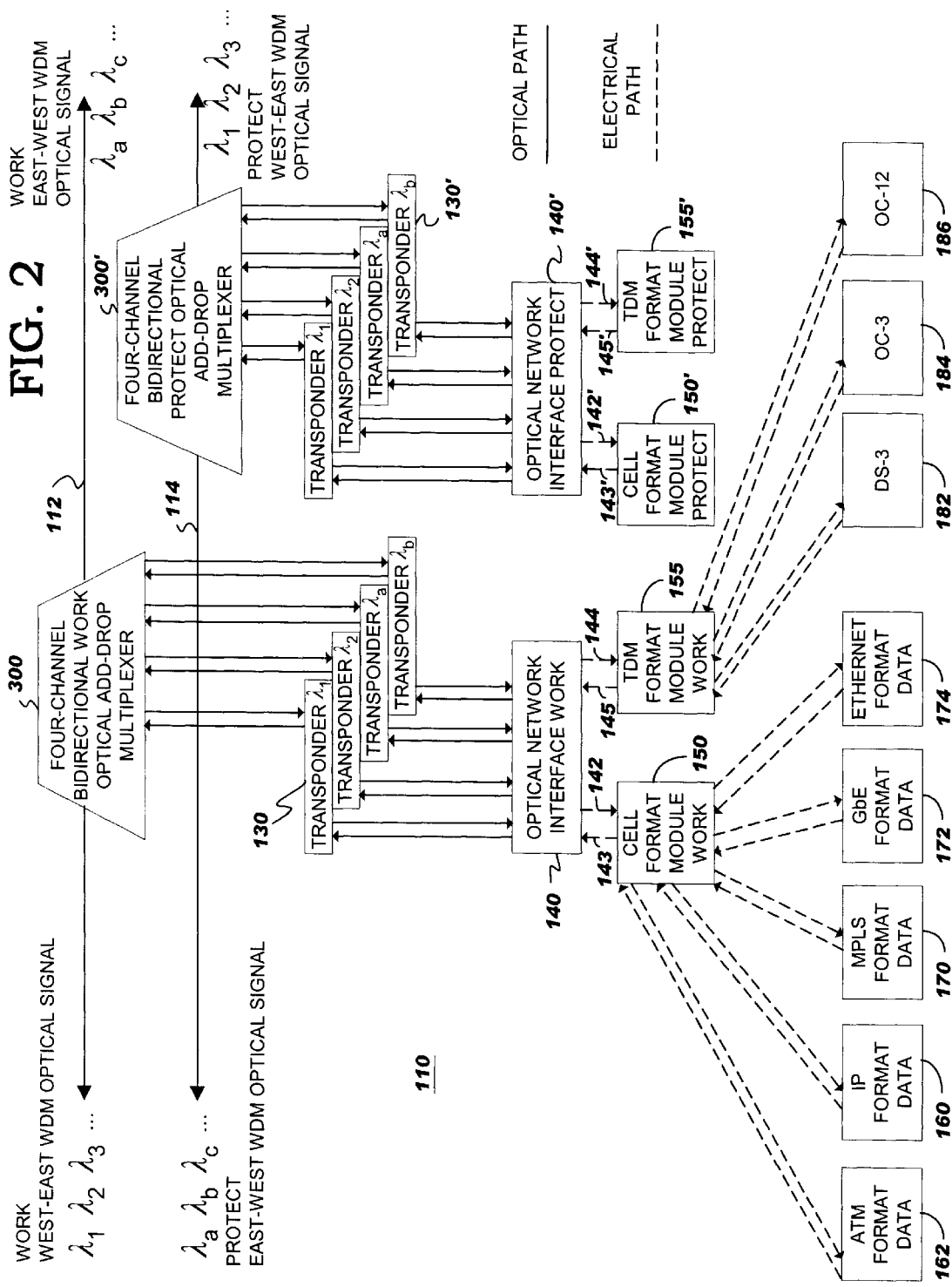
FIG. 2 is a bidirectional wavelength division multiplexed optical communication system configured to simultaneously accept multiple data formats on an individual optical channel according to a further embodiment of the present invention.

Turning to FIG. 2, a WDM optical communication system 110 is depicted according to a further embodiment of the present invention. WDM system 110 is a bidirectional, 64-channel optical system having two counter-propagating 32-channel WDM optical signals. As is common in commercially-deployed optical communication systems, there is a "work" optical waveguide 112 may and a "protect" optical waveguide 114. As is known in the art, the protect waveguide 114 is used to transport traffic during failure of waveguide 112 (e.g., through a break in the optical waveguide, transmission equipment failure, etc.) in order to prevent a disruption in service.

In accordance with traditional industry nomenclature, one of the WDM signals propagating in a first direction is designated the west-east WDM signal while the WDM signal propagating in the opposite direction is designated the east-west WDM signal. The individual optical channels in the west-east WDM optical signal are denoted by the symbols $\lambda_1$, $\lambda_2$, $\lambda_3$ etc., while the individual optical channels in the east-west WDM optical signal are denoted by the symbols $\lambda_a$, $\lambda_b$, $\lambda_c$, etc. for clarity of presentation. Waveguide 112 is a bidirectional work waveguide while waveguide 114 is a bidirectional protect waveguide. The identical traffic is carried over each bidirectional waveguide to prevent interruption of service caused by failure of one waveguide. It is noted that although the embodiment of FIG. 2 is described in the context of a bidirectional optical system, the system of FIG. 2 can also be employed in a unidirectional optical communication system.

Figure 3:
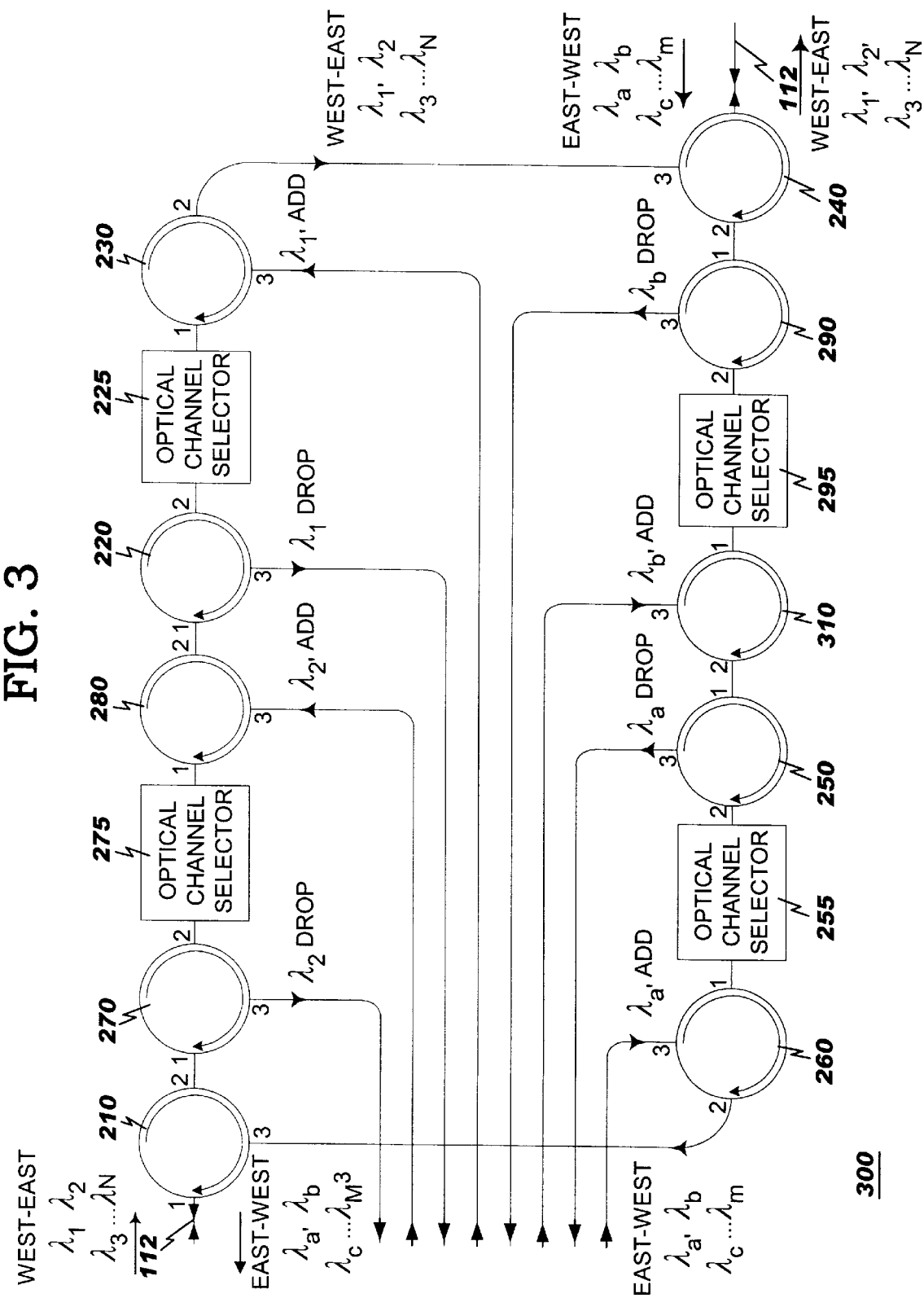
FIG. 3 is a bidirectional add-drop multiplexer which may be used in the bidirectional optical system of FIG. 2.

Optical add-drop multiplexers 300 are positioned along each bidirectional waveguide for adding and dropping optical channels. In this embodiment, the optical add-drop multiplexers are selected to be four-channel bidirectional add-drop multiplexers. Such multiplexers are configured to add-drop two channels to/from each of the counter-propagating WDM optical signals. An exemplary bidirectional add-drop multiplexer 300 is depicted in FIG. 3 and is further described in co-pending U.S. patent application Ser. No. 09/677,764 filed Oct. 3, 2000, assigned to the assignee of the present invention, the disclosure of which is incorporated by reference herein. Bidirectional add-drop multiplexer 300 will be discussed in further detail in connection with FIG. 3, below. For illustrative purposes, $\lambda_1$ and $\lambda_2$ are indicated as being add-dropped from the west-east WDM optical signal, while $\lambda_a$ and $\lambda_b$ are indicated as being add-dropped from the east-west WDM optical signal.

Channels to be added to the optical communication system through add-drop multiplexers 300 are produced by transponders 130. Transponders 130 both receive the optical channels dropped by add-drop multiplexers 300 and produce the optical channels to be added by the add-drop multiplexers. Transponders 130 include a short-reach optical interface and interact with the optical network interface 140 through these short-reach optical signals which are carried by optical paths 142, 143, 144, and 145.

As in the embodiment depicted in FIG. 1, optical network interfaces 140 combine data from plural data sources having different data formats and place that information on individual optical channels such that each optical channel carries information having different data formats. In the embodiment of FIG. 2, additional elements, cell format module 150 and TDM format module 155 are provided so that data from the various individual data sources can be intelligently routed and arranged on a particular optical channel. Although a single cell format module 150 and TDM format module 155 are depicted in FIG. 2, a pair of cell format and TDM modules are associated with each of the four optical channels being add-dropped by optical add-drop multiplexer 300; the remaining modules have been omitted for clarity of presentation.

As seen in FIG. 2, the TDM format module 155 takes data which is already TDM formatted- schematically depicted as the electrical communication of this module with TDM data sources such as DS-3, OC-3, and OC-12 signals. As with the expression "optically communicates" the expression "electrically communicates" denotes an electrical path between two elements. The electrical path may be a direct path or it may route through intermediate electrical devices. In this way, signals which already contain TDM formats are not broken up into packets or cells, incurring additional overhead bits identifying the respective payloads. Alternatively, the TDM signal sources may be further broken down into their component signals prior to the format modules and traffic routed through the system based on the format of the component signals.

Conversely, the cell format module 150 takes data which is organized into packets or cells and transports it to optical network interface 140. Cell format module electrically communicates with cell or packet-formatted data sources such as ATM-formatted data source 162, IP format data source 160, MPLS format data source 170, Gigabit Ethernet format data source 172, Ethernet format data source 174, etc. The data from data sources 160, 162, 170, 172, 174, etc. are thus intelligently arranged for presentation to optical network interface 140 which can then group the data efficiently for output onto the optical channel. Cell format module 150 sends this information to optical network interface 140 via electrical path 143 while TDM format module 155 sends this information to the optical network interface via electrical path 145.

Note that although cell format module 150 and TDM format module 155 are depicted as separate units, the modules may optionally be combined into a single formatting module which performs both the functions of grouping the cell-based data from the various cell/packet based data sources and grouping the TDM data from the various TDM based data sources. In this manner, a single switching module can receive data from all types of data sources and intelligently route that data to the optical network interface.

In the optical network interface module 140, the information from the cell module 150 and the TDM module 155 is arranged for placement onto a short-reach optical signal for communication along optical path 132 to transponder 130. Transponder 130 converts the short-reach optical signal into a modulated optical signal having a wavelength corresponding to $\lambda_1$ of the channel plan. The optical channel to be added, designated as $\lambda_{1'}$, is transported along optical path 122 to optical add-drop multiplexer 300 for addition to the west-east wavelength division multiplexed optical signal. Again, note that $\lambda_1$ is used as an exemplary channel; through the use of the optical network interface, the information may be placed on any optical channel to be added to the system. Further, incoming data may be separated into its fundamental units and placed on plural optical channels. For example, an incoming OC-12 signal may be decomposed into four OC-3 signals; each of these signals may be independently placed on any of the outgoing optical channels.

Although not shown in FIG. 2, a cell format module 150 and TDM format module 155 are provided for each optical channel; similarly, the data sources shown are those for each optical channel. Further, in order to populate the protect ring, the incoming data is duplicated and sent to protect cell and TDM modules 150' and 155'; such duplication for work and protect paths is known in the art (it is not shown in FIG. 2 for clarity of presentation). In order to provide additional system survivability in the event of a failure, an electrical cross-connect may optionally be provided interconnecting the cell and TDM format modules of the work system with the optical network interface of the protect system and interconnecting the cell and TDM format modules of the protect system with the optical network interface of the work system. In this way, data can be efficiently routed to the surviving optical path to prevent service interruption.

When an optical channel is dropped by optical add-drop multiplexer 300, the optical signal follows the same path outlined above in reverse. The optical channel is converted in transponder 130 from an optical signal at the channel plan wavelength to a short-reach interface optical signal which is output along optical path 132 to optical network interface 140. In optical network interface 140, the optical signal is converted to an electrical signal. Cell-based data is routed to cell format module 150 via electrical path 142 while TDM-based data is routed to TDM format module 155 through electrical path 144.

Based on the information in the signal, cell format module 150 routes the information to the corresponding ATM, IP, MPLS, etc. module; similarly, TDM format module routes the information to the corresponding DS-3, OC-3, OC-12, etc. module to be sent to the end user. In some instances, it may be desirable to re-route traffic from a dropped optical channel onto another optical channel to be added to the WDM signal such that the traffic continues along the transmission path and is not terminated at the add-drop point. This information is identified by the respective TDM format or cell format module and is routed back to the optical network interface module for placement on an outgoing optical channel.

FIG. 3 depicts a bidirectional optical add-drop multiplexer which may be employed in the optical system of FIG. 2. As seen in FIG. 3, bidirectional add-drop multiplexer 300 includes ten three-port optical circulators 210, 220, 230, 240, 250, 260, 270, 280, 290, and 310. The bidirectional add-drop multiplexer is interposed along bidirectional waveguide 112. Bidirectional waveguide 112 places the west-east wavelength division multiplexed optical signal into the first port of first circulator 210 where it is routed to the first port of the second optical circulator 270. Optical channel selector 275 is positioned between the circulator 270 and circulator 280 for add/dropping the optical channel designated $\lambda_2$. The through channels and any added channels exit through the second port of circulator 280 and enter circulator 220. Again, the drop-add channel pair is selected by channel selector 225 and the added channels and through channels exit through port 2 of circulator 230. The through west-east channels with the added channels exit the add-drop multiplexer through port 1 of circulator 240 as the west-east channels enter through port 1 of circulator 240. As with the west-east channels, the circulators 240, 290, 310, 260 and channel selectors 295 and 255 add-drop the optical channels $\lambda_a$ and $\lambda_b$ in the same manner as $\lambda_2$ and $\lambda_1$ were add-dropped for the west-east channels. In this manner, two channel pairs for each counter-propagating WDM optical signal are add-dropped by add-drop multiplexer 300. The channel selectors 225, 255, 275, and 295 may either be fixed, i.e., configured to always add-drop a particular optical channel having a given channel wavelength, or they may be dynamically reconfigurable, i.e., capable of add-dropping an optical channel at any optical wavelength to which the selector can be set. Depending upon the choice of fixed or reconfigurable channel selectors, the channel-selecting element may be chosen from devices including, but not limited to, Bragg gratings, tunable Bragg gratings, Fabry-Perot filters, acousto-optic tunable filters, multilayer dielectric thin film filters, arrayed waveguide gratings (AWGs) and/or combinations of these devices. Detailed descriptions of such optical selection devices are found in chapter 3 of *Optical Networks: A Practical Perspective*, incorporated by reference above.

Advantageously, plural circulator/channel selector systems may be added as needed to bidirectional add-drop multiplexer 300 when desiring to create a bidirectional add-drop multiplexer capable of add-dropping more optical channels. By separating the add/dropping of a single optical channel at a time with multiple circulator/channel selector sub-systems, the traffic may be more readily routed to diverse locations (e.g., different SONET rings, interexchange vs. local destinations, unidirectional local networks on customer premises, etc.). Because bidirectional optical waveguides 112 and 114 must be interrupted at many locations in a local network to interpose the bidirectional add-drop multiplexers, it may be advantageous to include optical amplification in the add-drop multiplexer to minimize the need to further insert optical amplifiers at other locations along the bidirectional transmission line.

Various channel plans can be accommodated by the systems of the present invention. For example, the west-east WDM signal may be selected to include only optical channels within the C-band (nominally defined as wavelengths from approximately 1530–1565 nm); conversely, the east-west WDM signal may be selected to include only optical channels within the L band (nominally defined as wavelengths from approximately 1565–1610 nm). For such a channel plan, implemented in the optical system of FIG. 2, the optical add-drop multiplexer would drop add-drop two C, L channel pairs to/from bidirectional waveguide 112. Such a channel plan simplifies optical amplifier selection since the amplifier chosen to amplify each signal band would be optimized to have a flat gain profile across that band.

Alternatively, the west-east channels may be selected from wavelengths across the entire wavelength spectrum to provide maximum interchannel spacing distance (and minimize potential cross talk. In such an embodiment, the east-west channel wavelengths would alternate with the west-east channel wavelengths in an interleaved manner (e.g., west-east channel wavelengths of 1528, 1532, 1536, 1540, etc. and east-west channel wavelengths of 1530, 1534, 1538, 1542, etc.). In either case, the west-east and east-west channels plans will likely be dictated by overall system considerations, such as the network topology in which the system is deployed. Further, because the west-east and east-west WDM optical signals are routed along different paths within the add-drop multiplexers, it is possible that one or more of the optical channel wavelengths in each of the counter-propagating WDM signals may be the same.

While the above invention has been described with reference to the particular exemplary embodiments, many modifications and functionally equivalent elements may be substituted without departing from the spirit and contributions of the present invention. Accordingly, modifications and functionally equivalent elements such as those suggested above, but not limited thereto, are considered to be within the scope of the following claims.

What is claimed is:

1. A wavelength division multiplexed optical communication system configured to simultaneously accept multiple data formats on individual optical channels comprising:

an optical waveguide configured to carry a wavelength division multiplexed optical communication signal comprising a plurality of optical channels, each optical channel having a discrete wavelength;

an optical add-drop multiplexer optically communicating with the optical waveguide configured to selectively add one or more optical channels to the wavelength division multiplexed optical communication signal;

an optical transponder optically communicating with the optical add-drop multiplexer for receiving an optical channel dropped from the add-drop multiplexer and producing a corresponding first short-reach optical signal to be output onto a first optical path from the transponder and for producing an optical channel to be added to the add-drop multiplexer;

a plurality of first data sources for imparting information onto a first optical channel in a cell format;

a cell format module electrically communicating with the plurality of first data sources for arranging the information from the first sources in a cell format;

a plurality of second data source for imparting information onto the first optical channel in a time division multiplexed format;

a TDM format module electrically communicating with the plurality of second data sources for arranging the data from the second sources in a time division multiplexed format;

an optical network interface electrically communicating with the cell format module and the TDM format module and optically communicating with the optical transponder for placing data from the cell format module and the TDM format module onto a second short-reach optical signal to be output from the optical network interface along a second optical path to the transponder such that the transponder converts the second short-reach optical signal to an optical channel to be output to the add-drop multiplexer.

2. A wavelength division multiplexed optical communication system as recited in claim 1 wherein the first plurality of data sources include ATM, IP, MPLS, and Ethernet formatted data sources.

* * * * *